United States Patent [19]

Breiling et al.

[11] 3,877,568
[45] Apr. 15, 1975

[54] APRON CONVEYOR FOR QUARRY EQUIPMENT AND THE LIKE

[75] Inventors: Edward H. Breiling, West Allis; Ronald B. Dediemar, Brown Deer, both of Wis.

[73] Assignee: Barber-Greene Company, Aurora, Ill.

[22] Filed: Dec. 3, 1973

[21] Appl. No.: 421,406

[52] U.S. Cl. ............. 198/204; 198/195; 308/207 A
[51] Int. Cl. ............................................. B65g 15/60
[58] Field of Search ................... 198/195, 196, 204; 308/207 A, 207 R

[56] References Cited
UNITED STATES PATENTS

| | | | |
|---|---|---|---|
| 1,531,060 | 3/1925 | Allbright | 198/196 |
| 2,725,975 | 12/1955 | Franz | 198/196 |
| 3,034,638 | 5/1962 | Franz | 198/195 |
| 3,156,506 | 11/1964 | Scheifeler et al. | 308/207 A |
| 3,425,760 | 2/1969 | Gordon | 308/207 R |
| 3,621,986 | 11/1971 | Webb et al. | 198/195 |

*Primary Examiner*—Evon C. Blunk
*Assistant Examiner*—Jeffrey V. Nase
*Attorney, Agent, or Firm*—James E. Nilles

[57] ABSTRACT

An endless apron conveyor which is used for conveying quarry material, such as crushed rock to or from crushers or other processing equipment. Special anti-friction, double, tapered roller bearings are provided for mounting both the head and foot shafts at opposite ends of the conveyor and in such a manner that the head and foot shafts are interchangeable with one another. Furthermore, the shafts are symmetrical about their center and they are reversible end for end for longer wear life of their sprockets.

Special means are provided for mounting the anti-friction, double, tapered roller bearings and their shaft, and these means include an upwardly opening bearing adaptor in which the anti-friction bearing assembly is mounted. The adaptor in turn is removably mounted in an upwardly facing, inclined opening in a mounting plate.

The anti-friction bearing assembly and other components of the shaft assembly are locked securely in place by shaft end caps and/or drive sprockets. The complete shaft can be easily removed.

Furthermore, a modular construction is utilized for installing the rollers which support the heavy duty apron conveyor and this modular construction facilitates the manufacture of conveyors of different lengths and also facilitates replacement and maintenance of the rollers.

8 Claims, 11 Drawing Figures

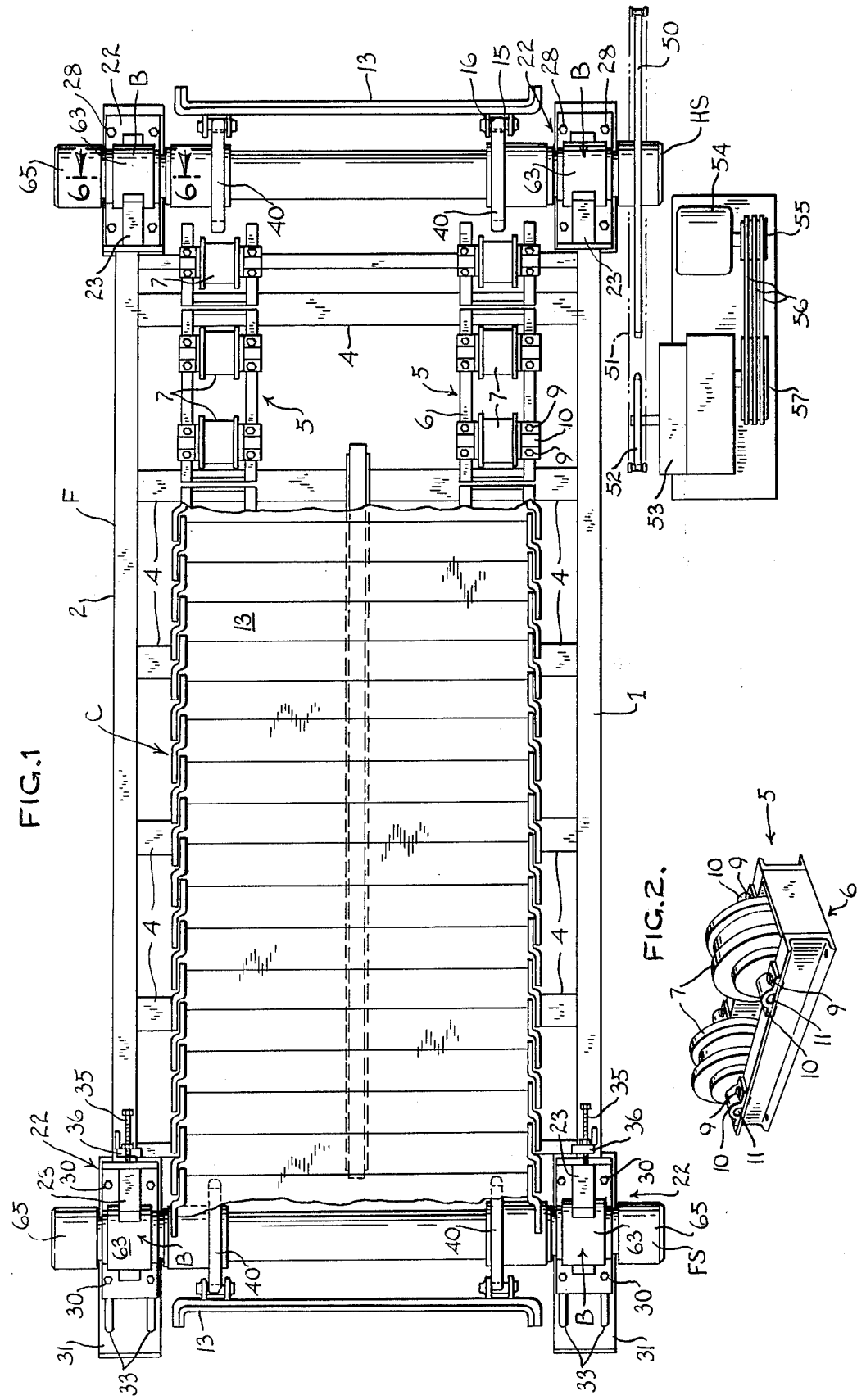

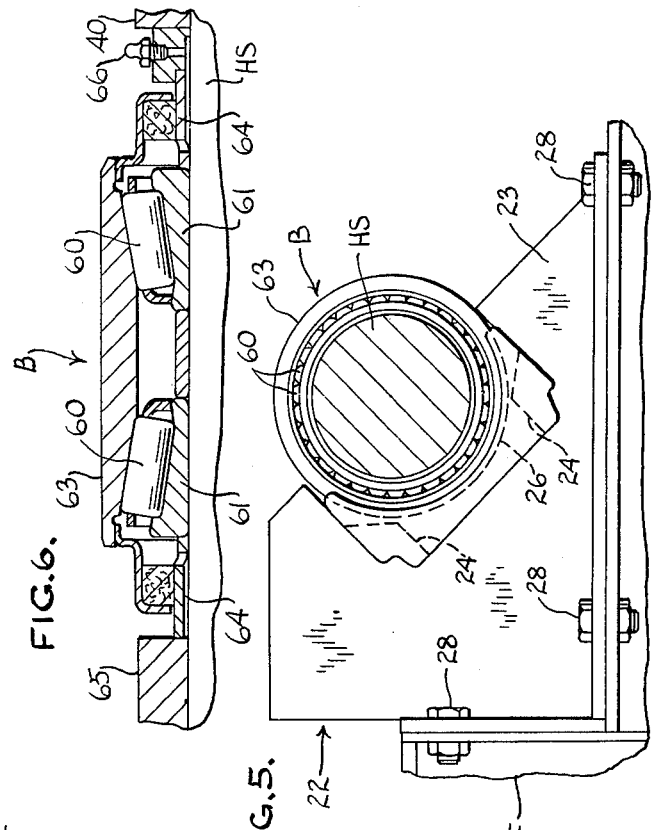
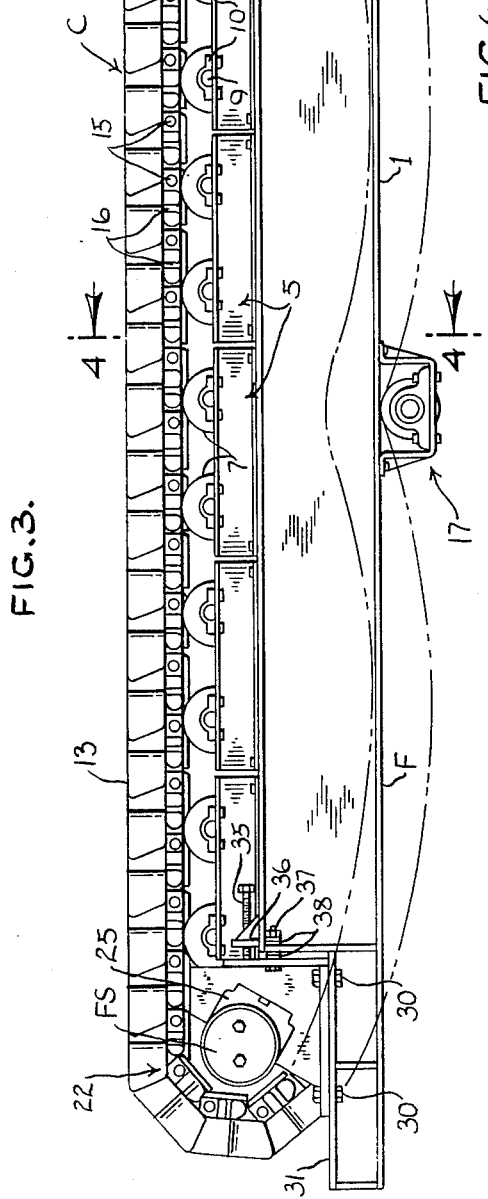
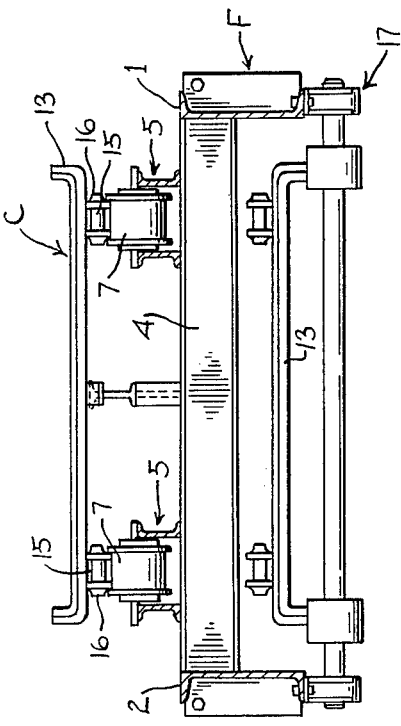

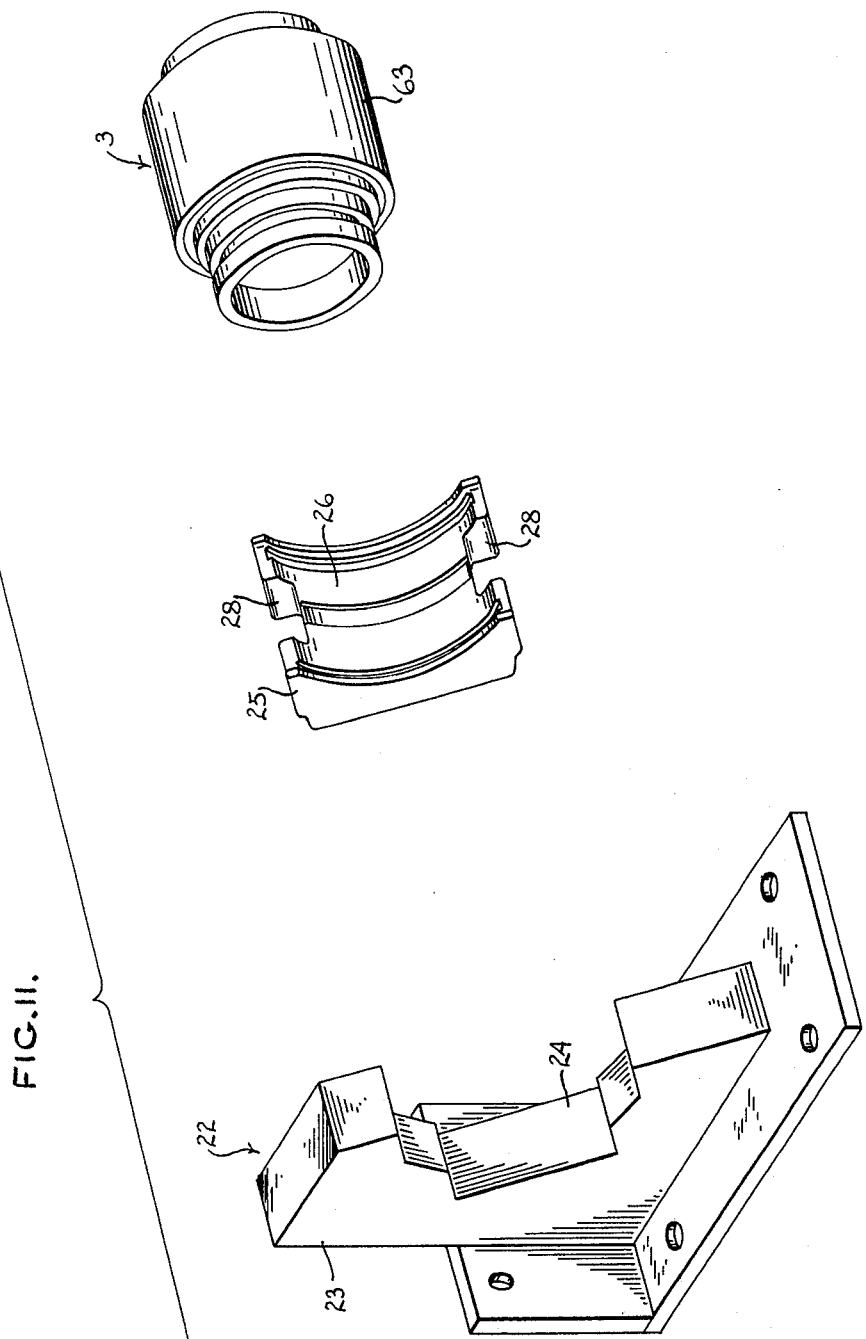

APRON CONVEYOR FOR QUARRY EQUIPMENT AND THE LIKE

BACKGROUND OF THE INVENTION

Endless, apron type heavy duty conveyors of the type to which the present invention pertains are subjected to extremely severe shocks and loads and the various bearings and other members of the conveyor must be periodically repaired or replaced. As these parts are extremely heavy and cumbersome to manipulate, to replace or repair, such repair is a time consuming job and one which entails considerable down-time. Prior art types of apron conveyors have proven to be generally satisfactory, but have required the operator to carry a large inventory of parts in order to be able to maintain operation in the event of failure of any parts. It has heretofore furthermore been difficult to provide proper maintenance, particularly lubrication of the bearings for the endless conveyor.

SUMMARY OF THE INVENTION

The present invention provides an endless apron type, heavy duty conveyor for handling quarry material such as crushed rock. One aspect of the invention relates to the sealed bearings and to the mounting for these bearings, for both the head and foot shafts of the endless conveyor. More specifically, the bearings utilized with the present invention are of the anti-friction, double, tapered roller bearings of the pre-assembled type and which are pre-set, prelubricated, and completely sealed, and which can be applied to or removed from the assembly without exposing the bearing elements, bearing seals, or lubricant.

The bearings are cradled in a bearing adaptor which has an inclined upwardly facing, semicircular opening for receiving the bearing. This adaptor in turn is cradled in an upwardly facing, inclined opening which is formed in a bearing mounting plate. The conveyor is trained over the head and foot shafts which are journalled in these bearings and the conveyor weight acts to hold the assembled shaft and bearings in the upwardly facing adaptor. The head and foot shafts of the endless conveyor, which are located one at each of the opposite ends of the conveyor, are interchangeable with one another also are each reversible, end for end, thereby greatly reducing the number of these large heavy shafts which it is necessary to stock, facilitating repair and replacement, and minimizing and equalizing wear on the various parts.

Another aspect of the invention relates to the modular construction for mounting the idler rollers which support the endless apron along its length. More specifically, a pair of rollers are mounted in steel sub-frames which in turn can be rigidly secured along the main frame of the conveyor. With this construction, it is possible to quickly fabricate endless conveyors of different lengths and by using the common sub-frame assemblies of the pairs of rollers.

The foot shaft of the conveyor can be adjusted longitudinally in the main frame so as to accommodate wear in the parts of the endless conveyor, and to be able to more easily assemble or disassemble the conveyor.

These and other objects and advantages of the present invention will appear hereinafter as this disclosure progresses, reference being had to the accompanying drawings.

BRIEF DESCRIPTION OF THE DRAWINGS

FIG. 1 is a plan view of a heavy duty apron conveyor made in accordance with the present invention, certain parts being shown as broken away or removed for the sake of clarity in the drawing;

FIG. 2 is a perspective view of one of the modular, roller units which are used in the device shown in FIG. 1;

FIG. 3 is a side elevational view of the conveyor shown in FIG. 1;

FIG. 4 is a transverse sectional view taken generally along the line 4—4 in FIG. 3;

FIG. 5 is a side elevational view partially in section, and on an enlarged scale, and of one shaft, its anti-friction bearing assembly, and the means for mounting said assembly;

FIG. 6 is a fragmentary, sectional view through the anti-friction bearing assembly for the shafts, the view being taken generally along the line 6—6 in FIG. 1, but on a greatly enlarged scale;

FIG. 11 is a perspective exploded view of the bearing mounting plate, the bearing adaptor and the bearing assembly.

DESCRIPTION OF A PREFERRED EMBODIMENT

Figure 8:
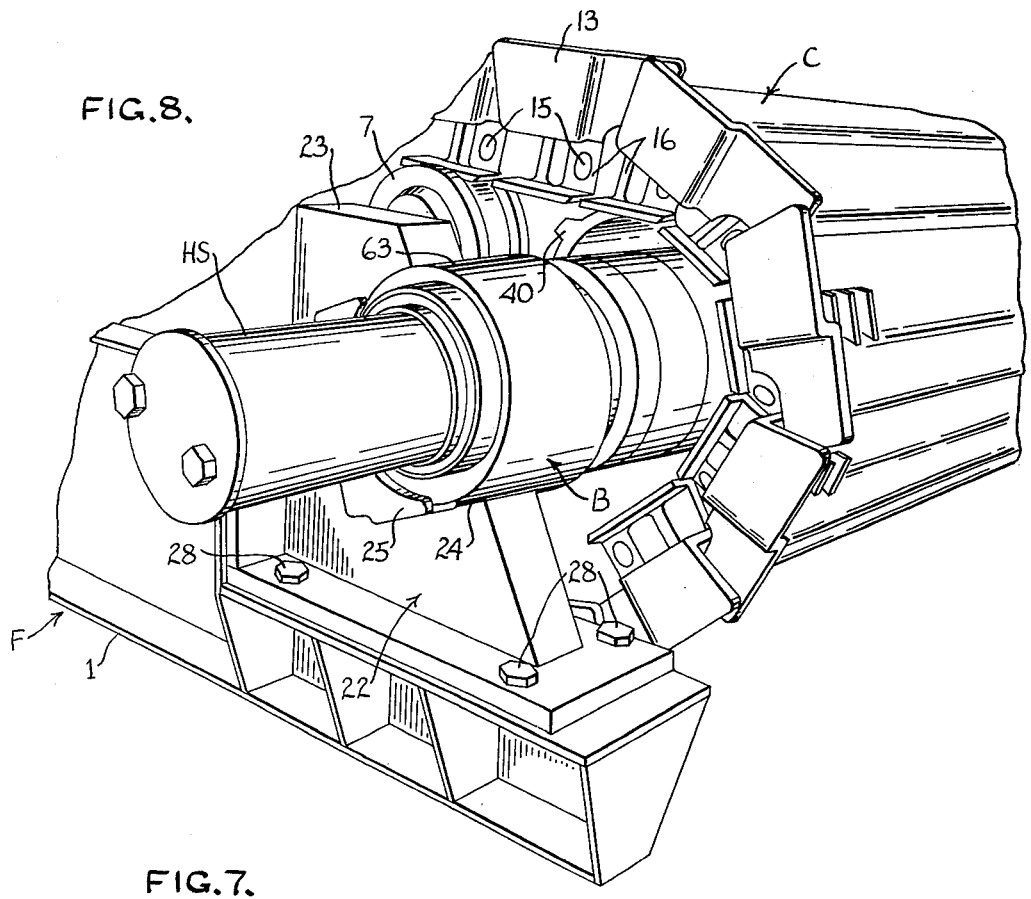
FIG. 8 is a perspective view of the haed end of the conveyor shown in FIG. head but on an enlarged scale and showing the mounting means for the bearing and its shaft.
Figure 7:
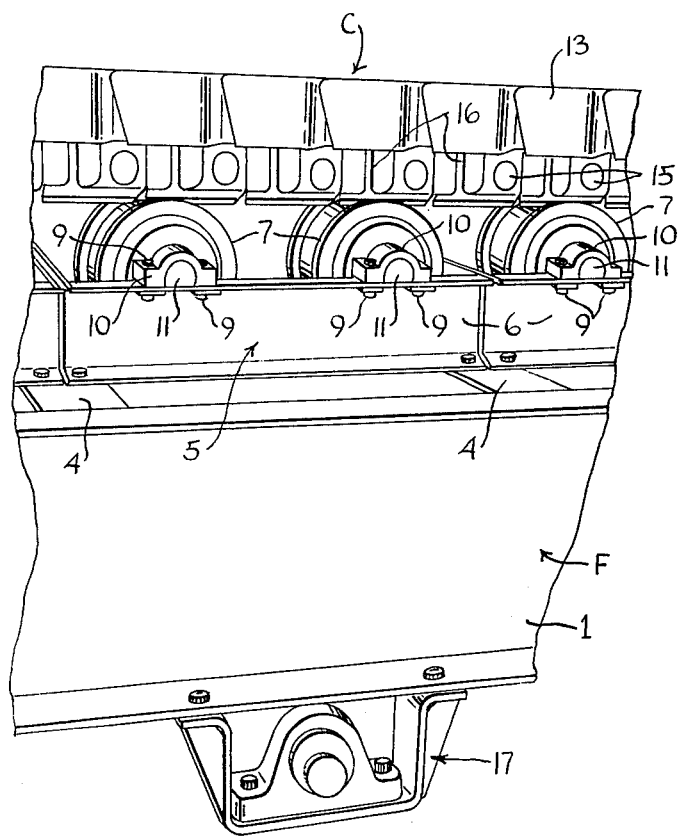
FIG. 7 is a fragmentary, perspective view taken generally from a side of the conveyor and showing the modular roller units as secured to the main frame and acting to support the endless conveyor, the view being enlarged from the FIGS. 1 and 2 view.

The apron conveyor provided by the present invention includes a main frame F which is fabricated from two heavy steel, longitudinally arranged channel members 1 and 2 which are rigidly connected together by a series of cross beams 4. Mounted on the upper side of the cross beams 4 are a series of modular units 5 (FIG. 2) which includes a box-like frame 6 fabricated from steel channel members and in which frame are journalled a pair of heavy duty rollers 7. It will be noted that a series of these units 6 are rigidly fastened to the main frame and in longitudinal alignment so that the rollers extend in longitudinal alignment along the main frame for supporting the upper flight of the endless conveyor C.

In connection with the modular roller units 5, it will be noted that bolts 9 act to hold the pillow block bearings 10 rigidly against the box-like frame 6, permitting the rollers and their shafts 11 to be readily replaced in the modular units 5.

It will furthermore be noted that the spacing between the cross beams 4 is such that adjacent beams 4 accommodate the modular units interposed therebetween.

With this construction, the length of the entire conveyor unit can be readily varied by using the common modular units, it being necessary only to vary the length of the side frame members 1 and 2 and of course, vary the number of flight elements 13 of which the endless conveyor C is comprised.

In connection with the apron type conveyor itself, it is conventional and includes a plurality of steel flight elements 13 which are pivoted by pins 15 to the interconnecting links 16 and which together form an endless chain. The upper flight of this endless chain rides along and is supported by the rollers 7. The lower or return flight, shown best in FIG. 3, is supported midway its length on the conventional idler roller assembly 17.

Located at each end of the main frame F and on each of opposite sides is a bearing mounting means 22 which is shown clearly in FIG. 5 and which includes a heavy steel bearing mounting plate 23 having a generally upwardly facing cut-away portion 24 in which is mounted a bearing adaptor 25 which in turn has a generally semi-spherical and inclined upwardly facing opening 26 which is inclined at an angle of about 30 degrees from the vertical so that it also faces generally away from the center of the conveyor. It is in this semi-spherical, inclined opening 26 that the anti-friction bearing B about to be described is cradled. The adaptor has opposed recesses 28 (FIG. 11) which embrace the plate 23 to prevent sidewise movement of the adaptor in the plate.

Figure 9:
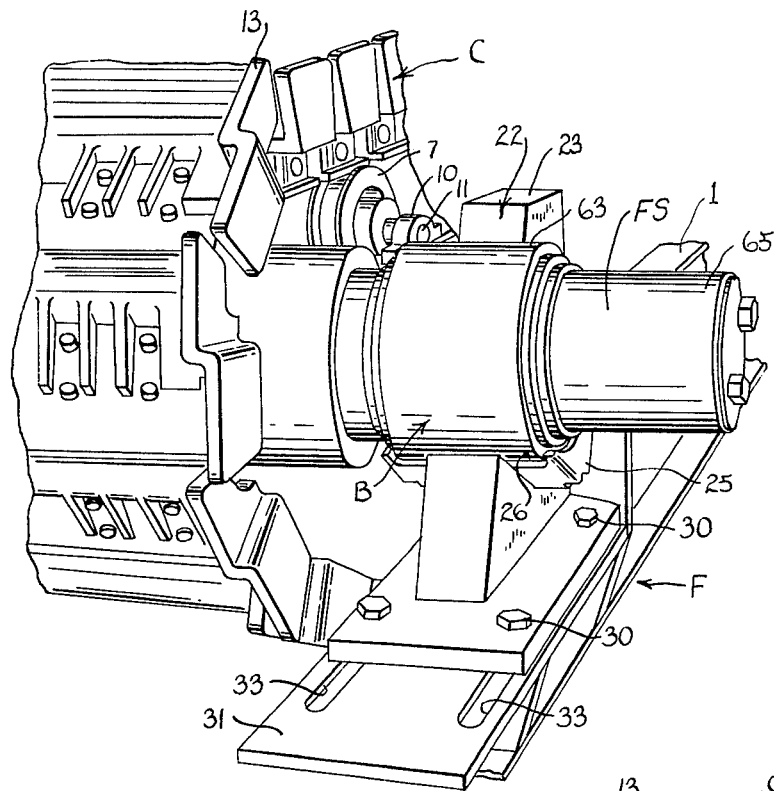
FIG. 9 is a perspective view of the foot end of the conveyor shown in FIG. 1, but on an enlarged scale and showing the foot shaft and its mounting in the main frame and furthermore showing the slotted portions of the main frame to accommodate adjustability of the bearing mounting.
Figure 10:
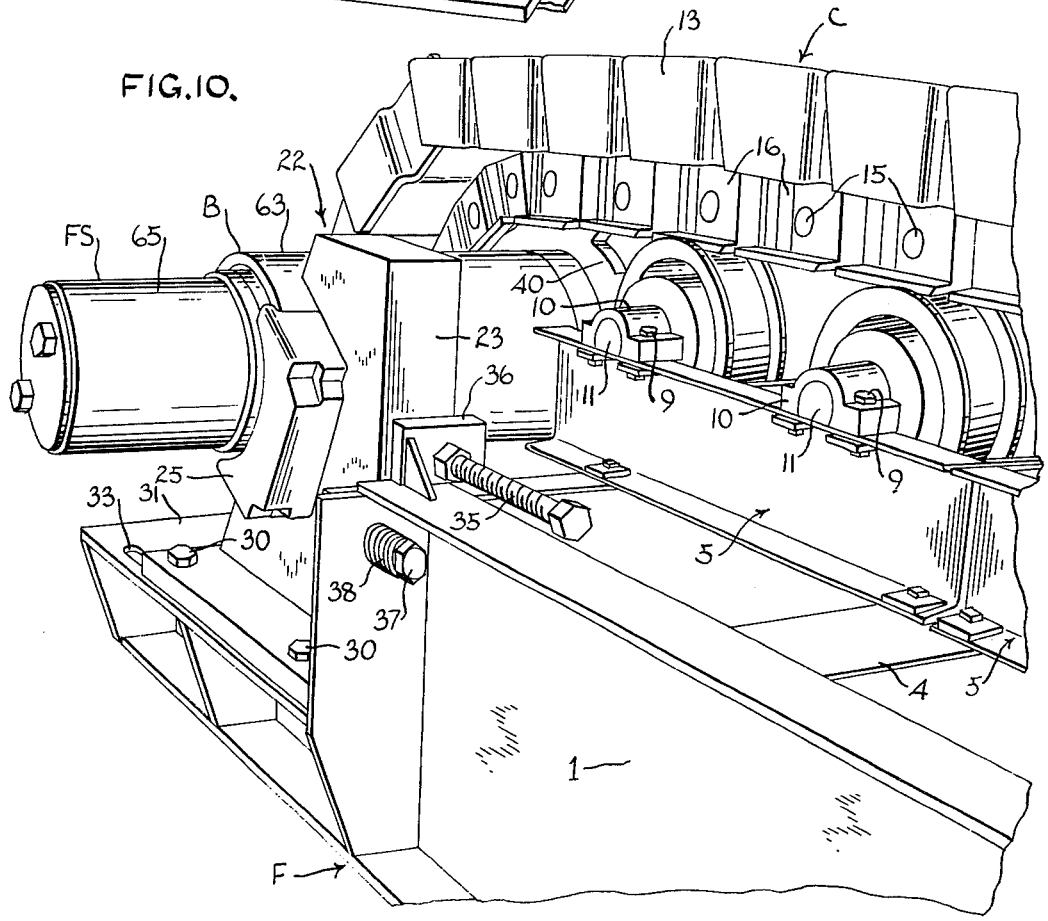
FIG. 10 is a perspective view of the device shown in FIG. 9, but taken from the other side of the shaft and showing the adjusting screw for shifting the bearing mounting relative to the main frame.

The heavy mounting plate 23 is secured by the bolt means 28 in the main frame at the head end of the conveyor and is fixed and unadjustable. At the foot end of the conveyor, that is the left end as viewed in FIG. 3, the bearing mounting plates 23 are mounted by the bolt means 30 to a generally horizontal surface 31 of the main frame F. This surface 31 of the main frame as shown in FIG. 9 has a pair of slots 33 through which the bolts 30 of the bearing plate 23 extend and by means of which the bearing plate 23 can be rigidly secured to the main frame in any adjusted position. As shown in FIGS. 3 and 10, a large bolt 35 is threaded in the bracket 36 which in turn is welded to the main frame and by turning the bolt 35, after first loosening the bolts 30, the bearing plate 23 can be adjusted longitudinally as to its position on the main frame F, thereby accommodating wear in the endless conveyor and also facilitating removal or assembly of the conveyor on the main frame.

In order to securely hold the bearing plates 23 in adjusted position, clamp bolts 37 are threaded in the main frame at each side thereof and can bear aganst the bearing plates. Replaceable washers 38 act as shims to take up the space between the main frame and the plates 23 and thus absorb the load.

As shown in FIG. 1, each of the shafts has a pair of sprockets 40 arranged symmetrically from the shaft ends, and which sprockets engage the links of the chain 16. The fixed, head end shaft HS has a large sprocket 50 fixed thereto which is driven through an endless chain 51 and from a smaller sprocket 52 of a gear reducer 53 which in turn receives its power from an electric motor 54, through the pulley 55, multiple endless belts 56 and the multiple sheaves 57 of the gear reducer, in the known manner. Thus, the head shaft HS constitutes a driven shaft and through its sprocket 40 drives the endless conveyor.

The anti-friction, double, tapered roller bearing assembly B for the shafts HS and FS are shown clearly in FIGS. 5 and 6 and include a series of rollers 60 which are mounted by the inner races 61 on their respective shaft. A single outer race 63 of the double tapered type embraces the assembled rollers and this outer race rests in the cradle formed by the semi-circular opening 26 of the bearing adaptor 25. The rollers are held in position by wear rings 64 and end caps 65. The bearings are self-contained, preassembled, pre-set, and pre-lubricated and is a completely sealed unit and which can be applied to and removed from, and without exposing, the bearing elements, the seals, or lubrication from contamination or damage. Even though the bearings are of the prelubricated type, grease fittings 66 are also provided for infrequent lubrication, if necessary.

The anti-friction bearing assemblies and their mountings as well as the shafts are interchangeable, thus greatly reducing the number of parts it is necessary for the operator to stock. This construction also provides a relatively easy means for servicing and replacing any of these parts.

We claim:

1. A heavy duty endless apron conveyor for quarry equipment and the like and comprising, a main frame, a shaft mounted on each of opposite ends of said main frame, an apron type endless conveyor trained around said shafts and having an upper flight; an anti-friction bearing assembly mounted on each end of each of said shafts, said bearing assemblies being self-contained, preassembled, pre-set and pre-lubricated, and comprising rollers, inner and outer double tapered races for said rollers, and means for sealing said bearings; and means for mounting each of said assemblies on said main frame and comprising a bearing mounting plate, a bearing adaptor mounted in said plate and having a generally semi-circular and upwardly facing opening which is inclined generally away from the center of said conveyor, said bearing assemblies mounted in said semi-circular openings for placement in and removable from said adaptors through said upwardly facing openings and without removal of said adaptors from said mounting plate.

2. The conveyor set forth in claim 1 including separate modular sub-frames secured to said main frame along the length thereof, bolt means for detachably securing said sub-frames to said main frame, said modular sub-frames each having a pair of idler rollers mounted therein; the upper flight of said endless conveyor adapted to be supported on said rollers.

3. A heavy duty endless apron conveyor for quarry equipment and the like and comprising, a main frame, a foot shaft and a head shaft mounted on opposite ends of said main frame, an apron type endless conveyor trained around said head shaft and foot shaft, said conveyor having an upper flight; an anti-friction bearing assembly mounted on each end of each of said shafts, said bearing assemblies being self-contained, preassembled, pre-set and pre-lubricated, and comprising rollers, inner and outer double tapered races for said rollers, and means for sealing said bearings; and means for mounting said assemblies on said main frame and comprising a heavy steel bearing mounting plate having a generally upwardly facing cut-away portion, a bearing adaptor mounted in said cut-away portion and having a generally semi-circular and upwardly facing opening which is inclined generally away from the center of said conveyor, said bearing assemblies mounted in said semi-circular opening and held therein by the weight of the endless conveyor trained around said shafts, said assemblies being placed in and removed from said adaptors through said upwardly facing openings and without removal of said adaptors from said mounting plates.

4. The conveyor set forth in claim 3 including a bolt and slot connection between said main frame and the bearing mounting plates of said foot shaft whereby the latter can be adjusted longitudinally on the main frame.

5. The conveyor set forth in claim 3 including modular sub-frames secured to said main frame along the length thereof, said modular sub-frames each having a pair of idler rollers mounted therein, the upper flight of said endless conveyor adapted to be supported on said rollers.

6. The conveyor set forth in claim 4 including modular sub-frames secured to said main frame along the length thereof, said modular sub-frames each having a pair of idler rollers mounted therein, the upper flight of said endless conveyor adapted to be supported on said rollers.

7. A heavy duty endless apron conveyor for quarry equipment and the like and comprising, a main frame, a shaft mounted on each of opposite ends of said main frame, an apron type endless conveyor trained around said shafts and having an upper flight; an anti-friction bearing assembly mounted on each end of each of said shafts, and means for mounting each of said assemblies on said main frame and comprising a bearing mounting plate, a bearing adaptor mounted in said plate and having a generally semi-circular and upwardly facing opening which is inclined generally away from the center of said conveyor, said bearing assemblies mounted on said semi-circular openings for placement in and removable from said adaptors through said upwardly facing openings and without removal of said adaptors from said mounting plate.

8. A heavy duty endless apron conveyor for quarry equipment and the like and comprising, a main frame, a shaft mounted on each of opposite ends of said main frame, an apron type endless conveyor trained around said shafts and having an upper flight; an anti-friction bearing assembly mounted on each end of each of said shafts, separate modular sub-frames secured to said main frame along the length thereof, bolt means for detachably securing said sub-frames to said main frame, said modular sub-frames each having a pair of idler rollers mounted therein, the upper flight of said endless conveyor adapted to be supported on said rollers, and means for mounting each of said assemblies on said main frame and comprising a bearing mounting plate, a bearing adaptor mounted in said plate and having a generally semi-circular and upwardly facing opening which is inclined generally away from the center of said conveyor, said bearing assemblies mounted in said semi-circular openings.

* * * * *